(12) United States Patent
Walters et al.

(10) Patent No.: US 10,030,494 B2
(45) Date of Patent: Jul. 24, 2018

(54) CYCLICAL DIVERSION TECHNIQUES IN SUBTERRANEAN FRACTURING OPERATIONS

(71) Applicant: Halliburton Energy Services, Inc., Houston, TX (US)

(72) Inventors: Harold G. Walters, Tomball, TX (US); David B. Allison, Spring, TX (US); Ronald G. Dusterhoft, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/911,984

(22) PCT Filed: Sep. 17, 2013

(86) PCT No.: PCT/US2013/060174
§ 371 (c)(1),
(2) Date: Feb. 12, 2016

(87) PCT Pub. No.: WO2015/041633
PCT Pub. Date: Mar. 26, 2015

(65) Prior Publication Data
US 2016/0194944 A1 Jul. 7, 2016

(51) Int. Cl.
*E21B 43/26* (2006.01)
*C09K 8/80* (2006.01)
(Continued)

(52) U.S. Cl.
CPC ............... *E21B 43/26* (2013.01); *C09K 8/62* (2013.01); *C09K 8/80* (2013.01); *E21B 43/267* (2013.01)

(58) Field of Classification Search
None
See application file for complete search history.

(56) References Cited

U.S. PATENT DOCUMENTS 3,151,678 A * 10/1964 Hanson ................ E21B 43/267
16/DIG. 32
3,235,007 A * 2/1966 Kieschnick, Jr. ..... E21B 43/267
166/280.1
(Continued)

FOREIGN PATENT DOCUMENTS

WO 2012/174065 A1 12/2012

OTHER PUBLICATIONS

"Bridge," Schlumberger Oilfield Glossary, retrieved Apr. 12, 2017 from http://www.glossary.oilfield.slb.com/Terms/b/bridge.aspx.*
(Continued)

*Primary Examiner* — Angela M DiTrani
(74) *Attorney, Agent, or Firm* — Craig Roddy; Baker Botts L.L.P.

(57) ABSTRACT

Enhanced methods for use in subterranean operations and, more particularly, for fracturing a subterranean formation are disclosed. In one embodiment, the method comprises: introducing into a wellbore penetrating a portion of a subterranean formation alternating intervals of a particulate-laden fluid comprising a plurality of particulates sized 100 U.S. mesh or smaller, and a treatment fluid comprising a lesser amount of particulates than the particulate-laden fluid; wherein the alternating intervals of the particulate-laden fluid and the treatment fluid are introduced into the wellbore at or above a pressure sufficient to create or enhance one or more fractures in the subterranean formation.

14 Claims, 2 Drawing Sheets

(51) Int. Cl.
*E21B 43/267* (2006.01)
*C09K 8/62* (2006.01)

(56) References Cited

U.S. PATENT DOCUMENTS

| | | | | |
|---|---|---|---|---|
| 3,245,470 A | * | 4/1966 | Henry | E21B 43/267 166/280.1 |
| 3,850,247 A | * | 11/1974 | Tinsley | E21B 43/267 166/280.1 |
| 3,896,877 A | * | 7/1975 | Vogt, Jr. | E21B 43/267 166/250.1 |
| 4,051,900 A | * | 10/1977 | Hankins | C09K 8/80 166/278 |
| 4,078,609 A | * | 3/1978 | Pavlich | E21B 33/138 166/271 |
| 4,143,715 A | | 3/1979 | Pavlich | |
| 5,054,554 A | * | 10/1991 | Pearson | E21B 43/267 166/280.1 |
| 5,597,043 A | | 1/1997 | Stadulis | |
| 6,367,548 B1 | | 4/2002 | Purvis et al. | |
| 6,776,235 B1 | * | 8/2004 | England | E21B 43/267 166/271 |
| 7,210,528 B1 | * | 5/2007 | Brannon | C09K 8/62 507/140 |
| 2013/0105166 A1 | * | 5/2013 | Medvedev | E21B 43/267 166/308.1 |

OTHER PUBLICATIONS

International Preliminary Report on Patentability issued in related PCT Application No. PCT/US2013/060174 dated Mar. 31, 2016, 13 pages.
International Search Report and Written Opinion issued in related PCT Application No. PCT/US2013/060174 dated Jun. 3, 2014, 16 pages.

* cited by examiner

CYCLICAL DIVERSION TECHNIQUES IN SUBTERRANEAN FRACTURING OPERATIONS

CROSS-REFERENCE TO RELATED APPLICATION

The present application is a U.S. National Application of International Application No. PCT/US2013/060174 filed Sep. 17, 2013, which is incorporated herein by reference in its entirety for all purposes.

BACKGROUND

The present disclosure relates generally to subterranean operations and, more particularly, to fracturing a subterranean formation.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation. In certain formations, such as low permeability formations like shale, hydraulic fracturing stimulation may be used to effectively produce fluids from the formation.

Fracturing treatments are commonly used in subterranean operations, among other purposes, to stimulate the production of desired fluids (e.g., hydrocarbons, water, etc.) from a subterranean formation. For example, hydraulic fracturing treatments generally involve pumping or otherwise introducing a treatment fluid (e.g., a fracturing fluid) into a well bore that penetrates a subterranean formation at a sufficient hydraulic pressure to create or enhance one or more cracks, or "fractures," in the subterranean formation. "Enhancing" one or more fractures in a subterranean formation, as that term is used herein, is defined to include the extension or enlargement of one or more natural or previously created fractures in the subterranean formation. The creation and/or enhancement of these fractures, among other things, may enhance the flow of fluids through the subterranean formation so that they may be produced out of the subterranean formation (e.g., into and out of a well bore penetrating at least a portion of the subterranean formation) more readily. Such fracturing treatments may also be performed in combination with other subterranean treatments useful in the particular formation, such as gravel packing and/or acidizing treatments, which may be referred to as "frac-packing" and "fracacidizing" treatments, respectively. Furthermore, it is to be understood that introducing a fluid into a well bore may include introducing the fluid into any one or more of the casing, tubing, annulus, and/or other portion of a wellbore penetrating a subterranean formation.

BRIEF DESCRIPTION OF THE FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to subterranean operations and, more particularly, to fracturing a subterranean formation.

The methods and treatments of the present disclosure generally involve fracturing a subterranean formation by alternate introduction of a small-particulate-laden fluid and a treatment fluid comprising a lesser amount of particulates into the subterranean formation and/or into a wellbore penetrating the subterranean formation. Among the many potential advantages of the present disclosure, the methods and treatments of the present disclosure may, among other things, increase the production of hydrocarbons and/or other fluids from a subterranean formation (e.g., to a well penetrating the subterranean formation). Such methods and treatments may, in certain embodiments, provide production advantages in certain types of formations such as low-permeability formations (e.g., shale, coal, and other low-permeability formations, including formations with permeability of approximately 1 millidarcy (mD) or less). Some of the methods and treatments may improve fracture geometry in a subterranean formation (e.g., by increasing the connected surface area of created and/or natural fractures within the formation).

Figure 1:
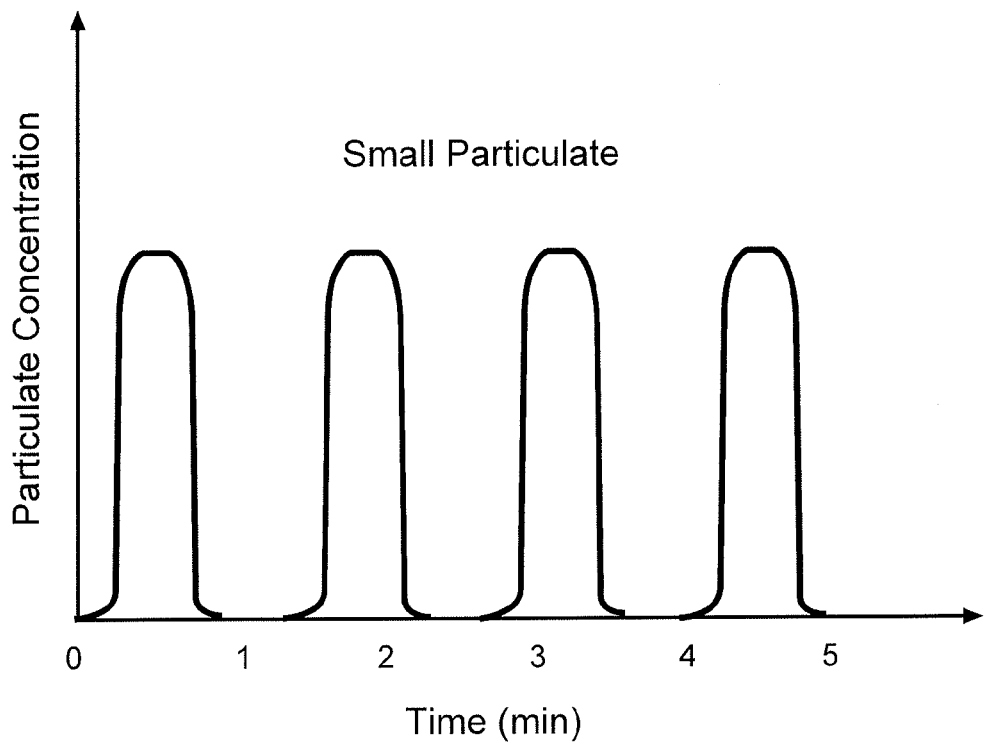
FIG. 1 is a chart of particulate concentration versus time in accordance with some embodiments of the present disclosure.

Alternate introduction of the aforementioned fluids may be achieved, in some embodiments, through a fluid pumping strategy such as pump cycling. Pump cycling may include pumping or otherwise introducing alternate intervals of (i) a treatment fluid, such as fracturing fluid, that comprises a base fluid and a lesser amount of particulates than the particulate-laden fluid) and (ii) a particulate-laden fluid (e.g., fluid that comprises a base fluid and particulates) into the subterranean formation and/or wellbore penetrating the subterranean formation. The alternate pumping of these intervals of fluids may result in periodic oscillation between lesser and greater values of particulate concentration in the fluid being introduced into the subterranean formation during the fracturing treatment, similar to the chart of particulate concentration vs. time shown in FIG. 1. In some embodiments, this oscillation may be between substantially zero and a non-zero value of particulate concentration (as shown in FIG. 1).

As used herein, a "particulate-laden" fluid is a fluid or portion of a fluid that comprises a base fluid and particulates. The base fluid of some embodiments may be the same (e.g., having substantially the same composition, and/or being two portions of the same fluid) in the particulate-laden fluid and in the treatment fluid comprising a lesser amount of particulates, although the base fluids may be different in certain embodiments. In some embodiments, the treatment fluid may comprise a lesser amount of particulates such that the ratio of the mass of particulates in that treatment fluid to the mass of particulates in the particulate-laden fluid is less than 1. In other embodiments this ratio may be less than 0.1, in other embodiments, less than 0.01, and in other embodiments, less than 0.001. In some embodiments, the treatment fluid comprising a lesser amount of particulates may contain substantially no particulates (e.g., only trace amounts of particulate or less) or no particulates at all. In certain embodiments, the treatment fluid comprising a lesser amount of particulates may be characterized as a "non-particulate-laden fluid." In the particulate-laden fluid, the concentration of particulates may in some embodiments range from about 0.5 to about 8 lb/gal. In other embodiments, it may range from about 1.0 to about 4.0 lb/gal, and in some embodiments, from about 1.5 to about 2.5 lb/gal. In some embodiments, the concentration of particulates in the particulate-laden fluid may have an approximate lower range of any one of: 0.5, 0.6, 0.7, 0.8, 0.9, 1.0, 1.1, 1.2, 1.3, 1.4, 1.5, 1.6, 1.7, 1.8, 1.9, and 2.0 lb/gal; and an upper range of approximately any one of: 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6. 3,7, 3.8, 3.9, 4.0, 4.1, 4.2, 4.3, 4.4, 4.5 lb/gal, and so on up to 8.0 lb/gal in increments of 0.1 lb/gal. Thus, the concentration range of particulates of some example embodiments may be from about 0.5 lb/gal to about 1.0 lb/gal, or from about 1.0 lb/gal to about 4.4 lb/gal, or from about 2.0 lb/gal to about 2.5 lb/gal, and so on, in any combination of any one of the upper and any one of the lower ranges recited above (including any 0.1 lb/gal increment between 4.5 and 8.0 lb/gal).

Pump cycling may include any suitable means of accomplishing the alternating introduction of the intervals fluids. In some embodiments, it may include alternating the fluid fed (e.g., alternating between feeding less-concentrated fluid and particulate-laden fluid) into a single pump for pumping treatment fluid downhole (e.g., down casing, tubing, and/or a wellbore penetrating a subterranean formation and then out into the subterranean formation). In other embodiments, it may include introducing the treatment fluid comprising a lesser amount of particulates downhole via an annulus defined between the wellbore and outer tubing or casing of the well and introducing particulate-laden fluid down the tubing or casing, or vice-versa, for intermixing downhole. In certain embodiments, pump cycling may include using two or more pumps, each pumping an interval of fluid downhole in alternating succession. For example, where two pumps are used, a first pump fed by a reservoir of less-concentrated fluid may be cycled on, then cycled off at substantially the same time that a second pump fed by a reservoir of particulate-laden fluid is cycled on. Then, the second pump may be cycled off at substantially the same time that the first pump is cycled back on again, and so on, such that the end result is the introduction of alternating intervals of fluids into the subterranean formation. In some embodiments, a treatment fluid comprising a lesser amount of particulates may be continuously pumped into the subterranean formation for substantially the entire duration of a fracturing treatment, while particulates and/or a particulate-laden fluid may be intermittently injected into the treatment fluid, so as to result in alternating sequences of (i) a treatment fluid comprising a lesser amount of particulates and (ii) a particulate-laden fluid being introduced into the wellbore and/or the subterranean formation. That is, particulates may be injected into the fluid by various means, including intermittent injection of dry particulates into the treatment fluid, and/or intermittent injection of a particulate-laden fluid into the treatment fluid stream. In other embodiments, a continuous stream of particulate-laden fluid may be pumped into the subterranean formation, with intervals of a treatment fluid comprising a lesser amount of particulates injected into the concentrated fluid stream, achieving a similar effect of alternating sequences of particulate-laden fluid and treatment fluid comprising a lesser amount of particulates introduced into the wellbore and/or the subterranean formation. Thus, the intervals of the treatment fluid comprising a lesser amount of particulates and the particulate-laden fluid may originate with the fluid reservoir, with the pump, and/or may be created by intermittent injection of particulate into a continuous stream of fluid (e.g., treatment fluid), as hereinabove described.

The duration of each interval may in some embodiments be approximately 30 seconds. In some embodiments, the duration of each interval may be any single time period within a range of time, such range having a lower end of approximately any one of 5, 10, 15, 20, 25, 30, 35, 40, 45, 50, 55, 60, and 65 seconds, and an upper range of approximately any one of 30, 35, 40, 45, 50, 55, 60, 65, 70, 75, 80, 85, 90, 95, 100, 105, 110, 115, 120, 125, 130, and 135 seconds, and so on up to 300 seconds in increments of 5 seconds. Thus, the duration of each interval may be, for example, about 5 to about 60 seconds; about 5 to about 55 seconds; about 5 to about 50 seconds, etc. By way of further example, the duration of each interval may in other embodiments be from about 15 to about 50 seconds; from about 20 to about 45 seconds; from about 25 to about 35 seconds; from about 30 to about 50 seconds; from about 50 to about 135 seconds; from about 50 to about 250 seconds, etc. Various other embodiments may encompass interval time duration ranges having any other combination of upper and lower ends. In addition, in some embodiments, interval durations may be varied during a treatment. For instance, a first interval of some embodiments may be of a first duration (e.g., about 30 seconds), and a second interval (whether immediately or indirectly following the first interval) may be of a second duration different from the first (e.g., about 100 seconds). In some embodiments, the duration of intervals may increase during a treatment with respect to previous intervals. For example, a first interval and/or a first set of intervals may be of a first duration, and a second interval and/or second set of intervals may be of a second, longer, duration. Even further, some embodiments may include a third interval and/or set of intervals may be a third duration, longer than the second, and so on. In certain embodiments, the duration of one or more intervals may increase as a fracture network (e.g., a series of connected fractures in the formation) around the wellbore grows in length and/or exposed area. Furthermore, although discussed in terms of "interval durations," the above time periods are equally applicable in embodiments wherein particulate and/or concentrated fluid are injected into a continuously pumped less-concentrated fluid (such that the time between each injection, and the duration of each injection, each correspond to an "interval" as just discussed).

The treatment fluid comprising a lesser amount of particulates of some embodiments may include any subterranean treatment fluid such as, e.g., a fracturing fluid. In some embodiments, the fracturing fluid may include any one or more of: water; a hydrocarbon fluid; a polymer gel; foam; air; wet gases; and/or other fluids. The treatment fluid may in some embodiments be sourced directly from a fluid source and delivered to a pump and/or other means for introducing the fluid into the subterranean formation. In certain embodiments, the treatment fluid may be formed prior to or in conjunction with delivery to a pump or other means for introducing the fluid into the subterranean formation. For example, it may be formed from a gel pre-cursor combined with a fluid to produce a hydrated fracturing gel, or other like fracturing fluid formulation means which will be apparent to those with skill in the art with the benefit of this disclosure. In some embodiments, there may be some trace amount of particulate in the treatment fluid comprising a lesser amount of particulates (e.g., about 0.1 ppg or less of particulate in some embodiments, or about 0.5 ppg or less of particulate in other embodiments). In certain embodiments, each interval of that treatment fluid may include a gradient of particulate concentration with respect to time—e.g., a gradually increasing concentration of particulate concentration—ranging from at or near zero to the concentration of particulate in the interval of particulate-laden fluid that is to follow an interval of treatment fluid comprising a lesser amount of particulates.

As noted, the particulate-laden fluid of some embodiments may include small particulates. It may also include any fluid capable of conveying the small particulates, which in some embodiments includes a treatment fluid according to the treatment fluids previously described. Thus, a particulate-laden fluid of some embodiments may comprise a treatment fluid and small particulates, although in certain embodiments, any other fluid capable of conveying particulates may instead or in addition be employed in each interval of particulate-laden fluid. Furthermore, as with the treatment fluid comprising a lesser amount of particulates of some embodiments, the particulate-laden fluid of certain embodiments may be capable of creating or enhancing one or more fractures in the subterranean formation.

The particulates of some embodiments may be about 100 U.S. mesh size (149 µm) or smaller. When referenced herein, a U.S. mesh and/or U.S. mesh size means that a particulate is sized to pass through that U.S. Standard sieve mesh size or a smaller mesh. In some embodiments, the particulates may be smaller than 100 U.S. mesh size. In other embodiments, the particulates may be sized such that they are about equal to or smaller than any one or more of: 120 U.S. mesh (125 µm); 140 U.S. mesh (105 µm); 170 U.S. mesh (88 µm); 200 U.S. mesh (63 µm); 270 U.S. mesh (53 µm); 325 U.S. mesh (44 µm); and 400 U.S. mesh (37 µm). In certain embodiments, the particulates may be nanoparticles (e.g., less than 1 $\mu m^2$ in cross-sectional area). In addition to or instead of the upper size limits of various embodiments listed above, some embodiments may include particulates with lower size limits of any one or more of: 100 $nm^2$ in cross-sectional area; 500 $nm^2$; 1 $\mu m^2$; 40 $\mu m^2$; 60 $\mu m^2$; 70 $\mu m^2$; 80 $\mu m^2$; 90 $\mu m^2$; 100 $\mu m^2$; 120 $\mu m^2$; or 140 $\mu m^2$ in cross-sectional area. Furthermore, the particulates of each interval of small-particulate-laden fluid according to some embodiments may be of substantially the same size, although in other embodiments, each interval of small-particular slurry may include differently-sized particulates according to the various sizes previously described. In some embodiments, the particulates may be substantially round, although certain embodiments may also or instead include particulates of various other shapes. In addition, notwithstanding the foregoing, some embodiments may include, in addition to the use of the above-described particulates, the subsequent use of particulate-laden fluid including larger particulates, such as particulates larger than 100 U.S. mesh size. Such subsequent use including larger particulates is described in greater detail below.

The particulates may be of any composition suitable for creating at least a temporary diverting effect within one or more fractures in the subterranean formation. The particulates of some embodiments may also or instead be of any composition capable of preventing or aiding in the prevention of closure of any one or more fractures in the subterranean formation (whether created, enhanced, and/or pre-existing fractures). Thus, the particulates of some embodiments may include, for example, any one or more of proppant particulates and diverting agents, although other particulates may be employed in some embodiments.

Proppant particulates may include any particulate capable of being deposited in one or more of the fractures in the formation (whether created, enhanced, and/or pre-existing). Examples of proppant particulates may include: bubbles or microspheres, such as made from glass, ceramic, polymer, sand, and/or another material. Other examples of proppant particulates may include particles of any one or more of: calcium carbonate ($CaCO_3$); barium sulfate ($BaSO_4$); organic polymers; cement; boric oxide; slag; sand; bauxite; ceramic materials; glass materials; polymer materials; polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and combinations thereof Suitable composite particulates may comprise a binder and a filler material wherein suitable filler materials may include any one or more of: silica; alumina; fumed carbon; carbon black; graphite; mica; titanium dioxide; meta-silicate; calcium silicate; kaolin; talc; zirconia; boron; fly ash; hollow glass microspheres; solid glass; and combinations thereof Proppant particulates are thought to help prevent the fractures from fully closing upon the release of the hydraulic or pressure applied during introduction of the treatment fluid comprising a lesser amount of particulates and/or particulate-laden fluid. A proppant particulate may in some embodiments include any particulate capable of being lodged in a fracture in a subterranean formation. In certain embodiments, proppant particulates may be capable of, and/or they may be used for, bridging one or more fractures in the subterranean formation. "Bridging" a fracture, as used herein, means to at least temporarily prevent all or substantially all flow of a fluid or other substance into or out of the fracture.

In such instances, then, the proppant particulates may be employed as diverting agents, although diverting agents other than proppant particulates may be included in particulate slurries of the present disclosure. As used herein, "diverting agent" is defined to include any agent or tool (e.g., chemicals, fluids, particulates, or equipment) that is capable of altering some or all of the flow of a substance away from a particular portion of a subterranean formation to another portion of the subterranean formation or, at least in part, ensure substantially uniform injection of a treatment fluid (e.g., a fracturing fluid) over the region of the subterranean formation to be treated. Diverting agents may, for example, selectively enter more permeable zones of a subterranean formation, where they may create a relatively impermeable barrier across the more permeable zones of the formation (including by bridging one or more fractures), thus serving to divert a subsequently introduced treatment fluid into the less permeable portions of the formation. This may, in some embodiments, allow for the creation or enhancement of additional fractures by subsequently-introduced treatment fluid comprising a lesser amount of particulates and/or particulate-laden fluid intervals. In certain embodiments, creation or enhancement of additional fractures may include connecting already created or already existing fractures.

Diverting agents may act by either or both of mechanical and chemical means. Thus, particulates of some embodiments may include either or both of mechanical and chemical diverting agents. By way of example, one or more particulates (such as one or more proppant particulates) may act as mechanical diverting agents when such one or more particulates enter a fracture and become lodged in the fracture in such a manner as to physically obstruct all or substantially all fluid flow in the fracture past the particulate(s), thereby bridging off the fracture. By way of further example, a diverting agent may be a gel (or gelling agent), tackifier, resin, or other compound that physically alters flow of a substance (and/or forms a compound that physically alters flow of a substance when introduced into a subterranean formation). As another example, a diverting agent may in addition or instead alter substance flow chemically. Thus, example diverting agents may include, but not be limited to: hydrophilic material that alters the flow of insoluble oil-phase substances; hydrophobic material that alters the flow of insoluble aqueous-phase substances; and combinations thereof (e.g., emulsions, or hydrophobically modified hydrophilic polymers). Furthermore, a diverting agent's diverting and/or impermeability effects may be temporary (e.g., the diverting agent may dissolve after a period of time in the subterranean formation, and/or when contacted by a particular fluid or fluids). Examples of suitable physical and/or chemical diverting agents may include any one or more of: poly lactic acid; polyglycalic acid; boric oxide; naphthalinic flakes; wax beads; rock salt (e.g., sodium chloride, calcium chloride, potassium chloride); poly(acrylamide); poly(lactide); poly(glycolide); protein; chitin; cellulose; dextran; poly(s-caprolactone); poly (hydroxybutyrate); poly(anhydride); aliphatic polycarbonate; poly(orthoester); poly(amino acid); poly (ethylene oxide); polyphosphazene; derivatives of the foregoing; and combinations of any of the foregoing.

Particulates according to some embodiments may bridge or otherwise cause diverting effects within one or more fractures either alone or by forming particulate clusters (e.g., particulate deposits) within the one or more fractures. Thus, in some embodiments, the particulates may be capable of adhering to each other or otherwise consolidating within a fracture so as to form a particulate cluster. For example, particulates may include any one or more adhesives such as: non-aqueous tackifying agents, aqueous tackifying agents, emulsified tackifying agents; silyl-modified polyamide compounds; resins; crosslinkable aqueous polymer compositions; polymerizable organic monomer compositions; consolidating agent emulsions; zeta-potential modifying aggregating compositions; and/or binders.

Figure 3A:
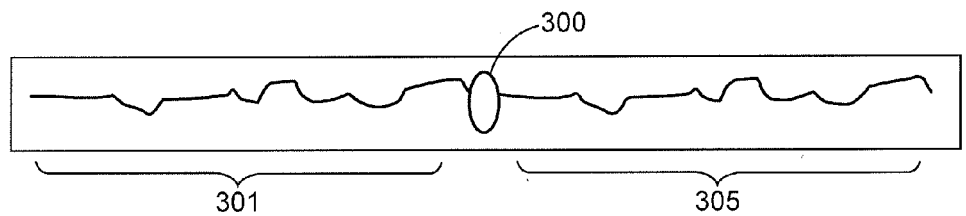
FIGS. 3A, 3B and 3C are stylized diagrams of fractures extending from a well-bore in accordance with some aspects of the present disclosure.
Figure 3B:
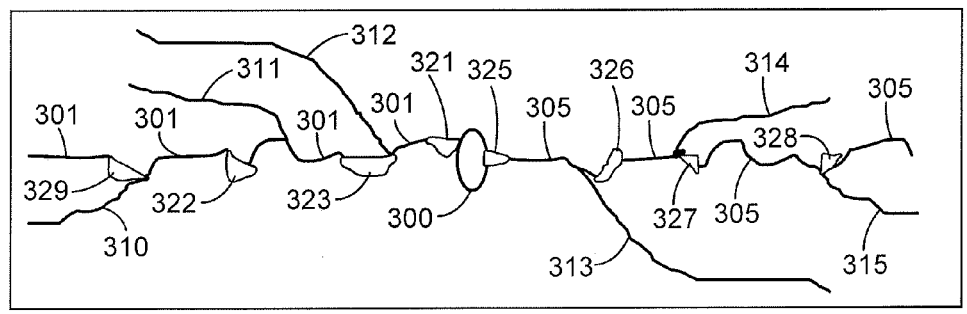
Figure 3C:
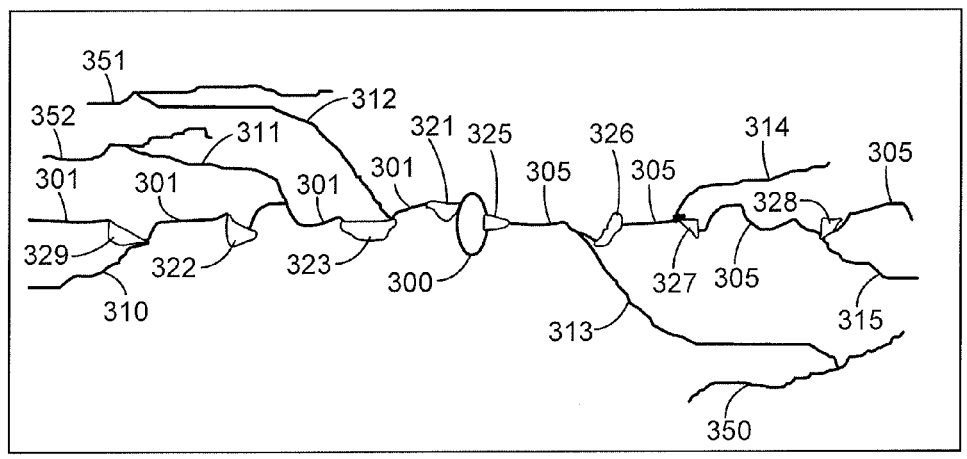

Diverting effects according to the methods of some embodiments may be illustrated by reference to FIGS. 3A and 3B, which are stylized representations of fractures created in accordance with the methods of some embodiments. FIG. 3A depicts two fractures 301 and 305 extending from a wellbore 300, according to a cross-sectional view looking down the wellbore 300. Such fractures may be created by a first interval of treatment fluid comprising a lesser amount of particulates in accordance with some embodiments. FIG. 3B illustrates the creation of secondary or additional fractures (e.g., fractures 310, 311, 312, 313, 314, and 315) due to the diverting action of particulate deposits (e.g., particulate deposits 31, 322, 323, 324, 325, 326, 327, and 328), each deposit comprising one or more particulates. Returning to the previous example referenced with respect to FIG. 3A, a first interval of particulate-laden fluid following the aforementioned first interval of treatment fluid comprising a lesser amount of particulates may deposit one or more particulates into the formation, resulting in, e.g., particulate deposits 321 and 328, whereupon the subsequent second interval of treatment fluid comprising a lesser amount of particulates and/or the subsequent second interval of particulate-laden fluid may be diverted by deposits 321 and 328 (e.g., where such deposits 321 and 328 bridge out the outlying portions of fractures 301 and 305) such that either or both intervals create or enhance additional fractures 310 and 315. The additional fractures 310 and 315 may in some instances connect fractures 301 and 305 with other pre-existing fractures, whether natural or previously created (not shown in FIG. 3B). Furthermore, the second interval of particulate-laden fluid may deposit one or more particulates resulting in deposits 322 and 327, which may similarly divert subsequent intervals of treatment fluid comprising a lesser amount of particulates fluid and/or subsequent intervals of particulate-laden fluid so as to create additional fractures 311 and 314, which similarly may in some instances connect fractures 301 and 305 with other pre-existing fractures, and so on. FIG. 3C depicts an example according to some embodiments wherein additional fractures 311 and 312 connect fracture 301 with pre-existing fractures 352 and 351, respectively; and additional fracture 313 connects fracture 305 with pre-existing fracture 350. This iterative process of diversion resulting in additional fractures and deposition of additional particulates may continue with each subsequent iteration, or, in some embodiments, with at least some of the subsequent iterations, of cycled intervals of fluids.

Particulates, including proppants and/or diverting agents, may in some embodiments be pre-formed and introduced into a particulate-laden fluid at the surface (which may then be introduced into the wellbore and/or the subterranean formation in accordance with the previous description). For instance, the methods of some embodiments may include introducing particulates into a reservoir of fluid so as to form a particulate-laden fluid prior to introducing the particulate-laden fluid. In other embodiments, however, the particulate-laden fluid may include particulate precursor instead of or in addition to particulate itself. In such embodiments, the particulate may be generated in the treatment fluid comprising a lesser amount of particulates during introduction of the fluid, and/or the particulate may be generated in the wellbore, and/or in the fractures themselves. Similarly, in some embodiments, intervals of particulate precursors may be intermittently introduced into a stream of treatment fluid comprising a lesser amount of particulates being introduced downhole so as to result in alternating sequences of fluids. Particulate pre-cursors may be any pre-cursor suitable for forming particulates when exposed to any one or more of various downhole conditions. One of ordinary skill in the art with the benefit of this disclosure will recognize suitable precursors for formation of various particulates downhole.

In addition, the particulates of some embodiments may form transient fracture bridges. For example, some particulates may be selected such that they decompose over time in the subterranean formation (e.g., when exposed to hydrocarbons and/or formation water being produced from the subterranean formation, and/or when exposed to follow-on treatment fluids such as acids, hydrocarbons, or other follow-on treatment fluids, and/or when exposed to heat). Some examples of transient particulates may include any one or more of wax beads and naphthalinic flakes. In other embodiments, the particulate may be permanent. In certain embodiments, the composition and/or properties of the particulate (e.g., its longevity and/or solubility characteristics) may be selected based at least in part upon one or more characteristics of the subterranean formation. For example, a particulate may be selected such that formation fluids such as formation water will not dissolve the particulate. One of ordinary skill in the art with the benefit of this disclosure will be capable of selecting appropriate particulate composition and/or characteristics based upon conventionally measured formation characteristics.

As previously noted, particulates within each interval of particulate-laden fluid may be of substantially uniform size, or they may be of a mixture of sizes. A "substantially uniform size," as used herein, may in some embodiments mean having a uniformity coefficient of no more than 1.3. In other embodiments, particulates of "substantially uniform size" may have a uniformity coefficient of no more than 1.25, alternatively no more than 1.2, alternatively no more than 1.15, alternatively no more than 1.10. A uniformity coefficient $C_U$ may be defined as $C_U = d_{60}/d_{10}$, where $d_{60}$ is the particulate cross-sectional area at which 60% of the particulates (by volume) have a smaller cross-sectional area than $d_{60}$, and $d_{10}$ is the particulate cross-sectional area at which 10% of the particulates (by volume) have a smaller cross-sectional area than $d_{10}$. Put another way, $d_{60}$ may be the mesh size that permits 60% (by volume) of particles to pass, while $d_{10}$ may be the mesh size that permits 10% (by volume) of particles to pass.

Figure 2:
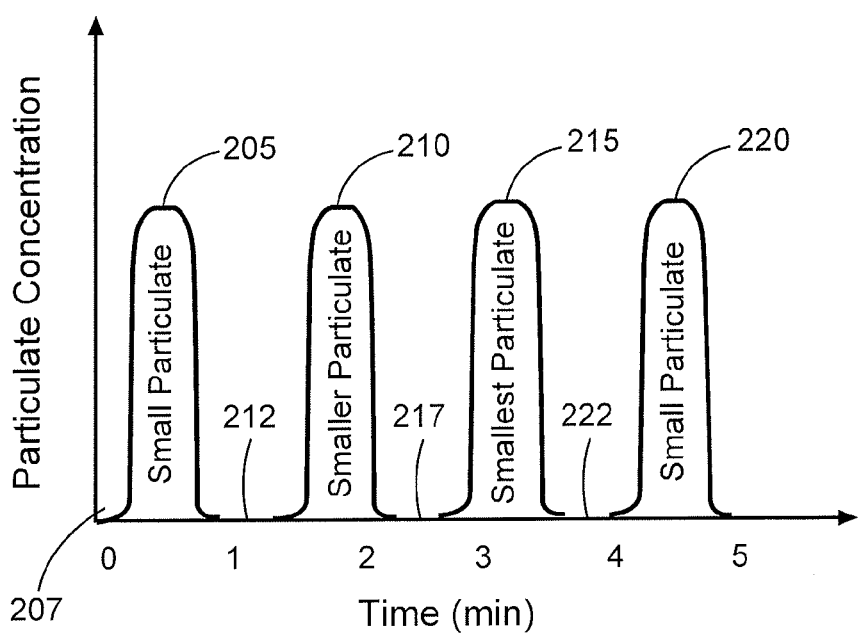
FIG. 2 is a chart of particulate concentration versus time for varying particulate sizes in accordance with some embodiments of the present disclosure.

The method of some embodiments may include alternately introducing into a subterranean formation each of a plurality of treatment fluid intervals comprising a lesser amount of particulates and each of a plurality of particulate-laden fluid intervals, wherein each particulate-laden fluid interval includes approximately the same distribution of particulate sizes. Thus, in some embodiments, each interval of particulate-laden fluid may include mixed-size particulates of approximately the same size distribution (with allowance for natural random variations in distributions between any two intervals). In other embodiments including particulates of uniform size, each interval of particulate-laden fluid may include particulates of that uniform size. In yet other embodiments, each sequential interval of particulate-laden fluid may include particulates of uniform size with respect to particulates of that interval, but with different size with respect to the previous concentrated fluid interval. Thus, for example, introduction of each of the plurality of concentrated fluid intervals may include switching between or among intervals including particles of different size, as shown in the chart of particulate concentration vs. time of FIG. 2. In FIG. 2, each spike in particulate concentration in the fluid introduced into the wellbore (205, 210, 215, and 220) corresponds to an interval of particulate-laden fluid, and each dip to substantially zero particulate concentration in the fluid introduced into the wellbore (207, 212, 217, and 222) corresponds to an interval of treatment fluid comprising a lesser amount of particulates. As shown in FIG. 2, spike 205 includes small particulate (e.g., particulates of substantially uniform size), spike 210 includes smaller particulate (e.g., particulates of substantially uniform size smaller than the particulates of the previous interval of particulate-laden fluid), spike 215 includes smallest particulate, and spike 220 corresponds to returning to introduction of an interval including small particulate. Thus, the methods of some embodiments may include intermittently introducing into a wellbore a plurality of particulate-laden fluid intervals, each interval separated in time by introduction of a treatment fluid comprising a lesser amount of particulates into the wellbore, and each interval including particulates of uniform size. In such embodiments, a first interval of particulate-laden fluid may include particulates of a first size, and a second interval of particulate-laden fluid may include particulates of a second size (e.g., a size smaller than the first size). A third interval of particulate-laden fluid may include particulates of a third size or, in some embodiments, it may instead include particulates of the first size.

In some embodiments, at least one interval of particulate-laden fluid may include particulates of a substantially uniform size that is different than the substantially uniform size of particulates of at least one other interval of particulate-laden fluid.

In some example embodiments, introduction of alternating intervals of a treatment fluid comprising a lesser amount of particulates and intervals of particulate-laden fluid may proceed in a manner according to, or at least similar to, the following. The introduction of the treatment fluid comprising a lesser amount of particulates into a subterranean formation may create or enhance one or more fractures in the subterranean formation. Any one or more of the particulates subsequently introduced into the formation in the first interval of particulate-laden fluid may lodge in at least one of the one or more fractures. The fractures into which one or more particulates are deposited may be propped (e.g., held open or at least prevented from closing in their entirety), and/or such fractures may be bridged such that fluid flow may be greatly diminished, or in some instances such that fluid may not pass, beyond the point of deposition of the one or more particulates in a given fracture. Thus, the treatment fluid comprising a lesser amount of particulates introduced into the formation in the subsequent second interval of treatment fluid may be diverted from a bridged fracture or fractures so as to create or enhance additional fractures, which may include linking pre-existing fractures in the subterranean formation (e.g., fractures either created by a previous introduction of either the less-concentrated fluid or the concentrated fluid, or naturally existing fractures). Instead or in addition, the treatment fluid comprising a lesser amount of particulates introduced in the second interval of treatment fluid may enter a fracture propped by the one or more particulates so as to enhance that fracture. The one or more particulates introduced in the subsequent second interval of particulate-laden fluid may in turn be deposited into one or more of the additional fractures and/or into one or more of the enhanced propped fractures, resulting in further bridging (and thereby further diversion for creation of additional connections in the following third interval of less-concentrated fluid). Instead or in addition, the one or more particulates of the second particulate-laden fluid interval may prop one or more of the additional fractures. Such cyclical pulsing of treatment fluid comprising a lesser amount of particulates and particulate-laden fluid may continue for any number of iterations as desired, with compounding propping and bridging effects which may result in diversion over several different orders of magnitude, and/or deeper fracture penetration of the formation, and/or enhanced complexity of a fracture matrix within the formation (e.g., creation of more and more connections between fractures in the formation, forming a fracture network).

In addition, the small size of particulates used in such exemplary methods may allow propping and/or bridging of smaller hairline fractures (e.g., dendritic fractures and/or natural hairline fractures) extending from a primary fracture and/or naturally present in the formation, which might not be accessible to larger particulates (and therefore would close shortly after withdrawal of hydraulic pressure and remain closed, thereby not contributing to production of hydrocarbons and other fluids from the formation). In some embodiments, the size of particulates may be tailored to the expected size of natural fractures and/or the desired size of fractures to be created, propped, and/or bridged within a fracture matrix. For instance, in some embodiments, a particulate or particulates may be deposited so as to bridge a fracture with cross-sectional space at least as large as the cross-sectional area of the particulate, although in some embodiments particulate(s) may be deposited in a fracture with cross-sectional space at least twice the cross-sectional area of the particulate(s), or in other embodiments, a fracture with cross-sectional space at least three, four, five, or up to twenty times the cross-sectional area of the particulate(s). In some embodiments, nano-sized particulates (e.g., nanoparticulates) may be used to prop and/or bridge nanofractures (e.g., fractures with cross-sectional space less than about 1 μm).

Furthermore, in the above-described example embodiments and in some other embodiments, each interval of particulate-laden fluid introduced into the subterranean formation may penetrate the subterranean formation at a greater hydrostatic pressure than each corresponding interval of treatment fluid comprising a lesser amount of particulates (which may be due to, e.g., the presence of the particulates in each particulate-laden fluid interval). This may result in temporarily enlarged or dilated fracture size, in some instances enabling deposition of particulates sized to enter the temporarily enlarged or dilated fractures.

In addition to methods of some embodiments previously discussed, including intervals of particulate-laden fluid wherein the particulates are sized 100 U.S. mesh and smaller, the methods of certain embodiments may include the subsequent use of particulate-laden fluid comprising particulates larger than 100 U.S. mesh size (that is, after the introduction of one or more intervals of particulate-laden fluid comprising particulates 100 U.S. mesh size and smaller). For example, some embodiments may include introducing one or more intervals of particulate-laden fluid into the wellbore and/or subterranean formation, wherein each interval comprises particulates, and each of the particulates are sized 100 U.S. mesh size and smaller; and after then introducing one or more subsequent intervals of particulate laden fluid into the wellbore and/or subterranean formation, wherein each subsequent interval comprises particulates sized larger than 100 U.S. mesh size—for example, in some embodiments, particulates sized approximately 40/70 and/or 20/40 U.S. mesh size (e.g., sized to pass through 40-mesh but not through 70-mesh, and sized to pass through 20-mesh but not through 40-mesh, respectively). The use of such larger particulates in later stages of such embodiments may aid in the creation of a more conductive (e.g., with respect to formation fluids such as hydrocarbons) main fracture linked to the wellbore.

Thus, the methods and treatments of some embodiments may result in the creation and/or enhancement of fractures that penetrate less deeply into the reservoir away from the wellbore than in conventional treatments. In addition, the methods and treatments of some embodiments may create greater connected fracture surface area (e.g., through creation and/or enhancement of a greater number of connecting fractures), thereby creating, in some instances, more complex fracture matrices in a subterranean formation.

In one embodiment, the present disclosure provides a method comprising: introducing into a wellbore penetrating a portion of a subterranean formation alternating intervals of a particulate-laden fluid comprising a plurality of particulates sized 100 U.S. mesh or smaller, and a treatment fluid comprising a lesser amount of particulates than the particulate-laden fluid; wherein the alternating intervals of the particulate-laden fluid and the treatment fluid are introduced into the wellbore at or above a pressure sufficient to create or enhance one or more fractures in the subterranean formation.

In another embodiment, the present disclosure provides a method comprising: over a first time period, introducing a first interval of treatment fluid into a wellbore penetrating at least a portion of a subterranean formation at or above a pressure sufficient to create or enhance one or more fractures in the subterranean formation; over a second time period subsequent to the first time period, introducing a first interval of particulate-laden fluid comprising a first plurality of particulates sized 100 U.S. mesh or smaller into the wellbore at or above a pressure sufficient to create or enhance one or more fractures in the subterranean formation; bridging one or more fractures in the subterranean formation with at least one of the particulates of the first plurality of particulates; and at a third time subsequent to the second time period, creating an additional fracture in the subterranean formation with at least one of (i) a second interval of treatment fluid introduced into the subterranean formation and (ii) a second interval of particulate-laden fluid comprising a second plurality of particulates sized 100 U.S. mesh or smaller, wherein the treatment fluid comprises a lesser amount of particulates than the particulate-laden fluid.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
 introducing into a wellbore penetrating a portion of a subterranean formation, while substantially maintaining pressure in the wellbore at or above pressure sufficient to create or enhance one or more fractures, a fluid stream consisting of alternating intervals of
- a particulate-laden fluid comprising a plurality of particulates sized 100 U.S. mesh or smaller, and
- a treatment fluid comprising a lesser amount of particulates than the particulate-laden fluid;

wherein the alternating intervals of the particulate-laden fluid and the treatment fluid are introduced into the wellbore at or above a pressure sufficient to create or enhance one or more fractures in the subterranean formation and each interval of particulate-laden fluid comprises nanoparticle-sized particulates comprising a cross-sectional area of less than 1 µm².

2. The method of claim 1, further comprising allowing at least a portion of the particulates to at least partially bridge at least one fracture in the subterranean formation.

3. The method of claim 1, further comprising introducing each of the alternating intervals of the treatment fluid and of the particulate-laden fluid over time periods each lasting from about 5 to about 300 seconds.

4. The method of claim 1 wherein the ratio of the mass fraction of particulates in the treatment fluid to the mass fraction of particulates in the particulate-laden fluid is less than about 0.1.

5. The method of claim 4 wherein the ratio of the mass fraction of particulates in the treatment fluid to the mass fraction of particulates in the particulate-laden fluid is less than about 0.01.

6. The method of claim 4 wherein the treatment fluid contains substantially no particulates.

7. The method of claim 1, further comprising:
introducing a first pair of the alternating intervals of treatment fluid and of particulate-laden fluid over time periods each lasting for approximately a first time duration; and
introducing a second pair of the alternating intervals of treatment fluid and of particulate-laden fluid over subsequent time periods each lasting for approximately a second time duration that is longer than the first time duration.

8. The method of claim 1, wherein each of the plurality of particulates is sized 200 U.S. mesh or smaller.

9. The method of claim 1, wherein the particulates in at least one interval of particulate-laden fluid are of non-uniform size.

10. The method of claim 1, wherein each interval of particulate-laden fluid comprises particulates of substantially uniform size with respect to particulates of that interval of particulate-laden fluid.

11. The method of claim 10, wherein the substantially uniform size of particulates of at least one interval of particulate-laden fluid differs from the substantially uniform size of particulates of at least one other interval of particulate-laden fluid.

12. The method of claim 1 further comprising:
after introducing all of the alternating intervals of treatment fluid and of particulate-laden fluid, introducing at least one interval of large-particulate-laden fluid, wherein the large-particulate-laden fluid comprises particulates sized larger than 100 U.S. mesh.

13. A method comprising:
introducing into a wellbore penetrating a portion of a subterranean formation, while substantially maintaining pressure in the wellbore at or above pressure sufficient to create or enhance one or more fractures, a substantially continuous fluid stream consisting of a first interval of particulate-laden fluid, a second interval of particulate-laden fluid, a third interval of particulate-laden fluid, and one or more intervals of treatment fluid, wherein:
the first interval of particulate-laden fluid comprises particulates of a first substantially uniform size of 100 U.S. mesh or smaller;
the second interval of particulate-laden fluid comprises particulates of a second substantially uniform size that is smaller than the first substantially uniform size;
the third interval of particulate-laden fluid comprises particulates of a third substantially uniform size that is smaller than the second substantially uniform size; and
introduction of each of the first, second, and third intervals of particulate-laden fluid is preceded by introduction of an interval of treatment fluid comprising a lesser amount of particulates than the particulate-laden fluid into the wellbore.

14. The method of claim 13 wherein introducing the third interval of particulate-laden fluid is subsequent to introducing the second interval of particulate-laden fluid, and wherein introducing the second interval of particulate-laden fluid is subsequent to introducing the first interval of particulate-laden fluid.

* * * * *